United States Patent
Wang et al.

(10) Patent No.: US 9,806,820 B2
(45) Date of Patent: Oct. 31, 2017

(54) OPTICAL TRANSMITTER AND OPTICAL TRANSMISSION METHOD

(71) Applicant: Huawei Technologies Co., Ltd., Shenzhen (CN)

(72) Inventors: Haili Wang, Shenzhen (CN); Xi Chen, Shenzhen (CN); Shiyu Xie, Shenzhen (CN); Shengmeng Fu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/199,734

(22) Filed: Jun. 30, 2016

(65) Prior Publication Data

US 2017/0099108 A1 Apr. 6, 2017

Related U.S. Application Data

(63) Continuation of application No. PCT/CN2013/091171, filed on Dec. 31, 2013.

(51) Int. Cl.
*H04B 10/04* (2006.01)
*H04B 10/50* (2013.01)
(Continued)

(52) U.S. Cl.
CPC ..... *H04B 10/504* (2013.01); *H04B 10/07955* (2013.01); *H04B 10/564* (2013.01)

(58) Field of Classification Search
CPC ........... H04B 10/504; H04B 10/07955; H04B 10/564; H04B 10/503; G02B 6/29343; H01S 3/083
(Continued)

(56) References Cited

U.S. PATENT DOCUMENTS 6,285,809 B1 * 9/2001 Nir .................. G02B 6/125
                                                385/16
7,242,712 B1   7/2007 Katic
(Continued)

FOREIGN PATENT DOCUMENTS

CN   101046531 A   10/2007
CN   101427494 A   5/2009
(Continued)

OTHER PUBLICATIONS

Bernasconi et al., "DWDM Hybrid-Integrated TOSA and ROSA for 10x10.7-Gb/s Transmission over 75-km Links," IEEE Photonics Technology Letters, vol. 24, No. 18, pp. 1657-1659, Institute of Electrical Electronic Engineers, New York, New York (Sep. 15, 2012).

(Continued)

*Primary Examiner* — Hibret Woldekidan
(74) *Attorney, Agent, or Firm* — Leydig, Voit & Mayer, Ltd.

(57) ABSTRACT

Embodiments of the present invention disclose an optical transmitter and an optical transmission method. An embodiment of the present invention includes a directly modulated laser array and a micro-ring group array, where the directly modulated laser array may output multiple channels of optical signals, each directly modulated laser is correspondingly provided with one circular waveguide group and one first waveguide, each circular waveguide group may couple a part of optical signals output by a directly modulated laser corresponding to the circular waveguide group to a same second waveguide, and the second waveguide aggregates optical signals from circular waveguide groups and outputs an aggregated optical signals. The micro-ring group array implements not only filtering but also multiplexing, which (Continued)

effectively reduces a quantity of elements, reduces a size of an optical transmitter, and reduces costs.

9 Claims, 6 Drawing Sheets

(51) Int. Cl.
*H04B 10/564* (2013.01)
*H04B 10/079* (2013.01)

(58) Field of Classification Search
USPC ....... 398/182, 183, 192, 193, 194, 200, 201, 398/195, 196
See application file for complete search history.

(56) References Cited

U.S. PATENT DOCUMENTS

| | | | |
|---|---|---|---|
| 7,280,721 B2 | 10/2007 | McCallion et al. | |
| 7,286,620 B2 | 10/2007 | Cranford et al. | |
| 7,639,723 B2* | 12/2009 | Yamazaki | G02B 6/12007 372/20 |
| 7,657,179 B2* | 2/2010 | Mahgerefteh | G02B 6/29365 398/82 |
| 8,027,587 B1* | 9/2011 | Watts | G02B 6/12007 359/107 |
| 8,027,593 B2* | 9/2011 | Zhou | H04B 10/504 398/185 |
| 8,095,010 B2* | 1/2012 | Socci | G02B 6/12007 398/85 |
| 8,160,455 B2* | 4/2012 | Mahgerefteh | H04B 10/25137 398/192 |
| 8,260,150 B2* | 9/2012 | Mahgerefteh | G02B 6/29343 385/24 |
| 8,380,076 B2* | 2/2013 | Boffi | G02B 6/29394 398/119 |
| 8,611,747 B1 | 12/2013 | Wach | |
| 8,847,598 B2* | 9/2014 | Hardy | G06F 19/321 324/318 |
| 8,983,307 B2* | 3/2015 | Byun | H04B 10/572 398/186 |
| 9,008,515 B2* | 4/2015 | Neilson | G02B 5/20 398/183 |
| 9,080,953 B2* | 7/2015 | Heidrich | G01N 21/39 |
| 9,709,744 B2* | 7/2017 | Song | G02F 1/21 |
| 2005/0152488 A1 | 7/2005 | Buckwalter et al. | |
| 2008/0080864 A1 | 4/2008 | Bai | |
| 2008/0089697 A1 | 4/2008 | Shen et al. | |
| 2008/0095536 A1 | 4/2008 | Shen et al. | |
| 2009/0269069 A1 | 10/2009 | Mahgerefteh et al. | |
| 2011/0129227 A1 | 6/2011 | Wen et al. | |
| 2012/0207479 A1 | 8/2012 | Krishnamoorthy et al. | |
| 2013/0195463 A1 | 8/2013 | Byun et al. | |
| 2013/0279849 A1* | 10/2013 | Santori | G01J 3/0259 385/30 |
| 2016/0139484 A1* | 5/2016 | Casasanta, III | G02B 6/138 385/2 |
| 2017/0141870 A1* | 5/2017 | Testa | H04J 14/0212 |

FOREIGN PATENT DOCUMENTS

| | | |
|---|---|---|
| CN | 101449491 A | 6/2009 |
| CN | 101501541 A | 8/2009 |
| CN | 201408300 Y | 2/2010 |
| CN | 102405570 A | 4/2012 |
| CN | 202309723 U | 7/2012 |
| CN | 103155459 A | 6/2013 |
| EP | 1786121 A1 | 5/2007 |
| KR | 20130093839 A | 8/2013 |

OTHER PUBLICATIONS

Dong et al., "Low power and compact reconfigurable multiplexing devices based on silicon microring resonators," Optics Express, vol. 18, No. 10, pp. 9852-9858 (May 10, 2010).

Mahgerefteh et al., "Chirp Managed Laser (CML): A compact transmitter for dispersion tolerant 10Gb/s networking applications," Optical Fiber Communication Conference and the National Fiber Optic Engineers Conference, pp. 1-3, Institute of Electrical Electronic Engineers, New York, New York (Mar. 5-10, 2006).

Yariv, "Universal relations for coupling of optical power between microresonators and dielectric waveguides," Electronics Letters, vol. 36, No. 4, pp. 321-322, Institute of Electrical Electronic Engineers, New York, New York (Feb. 17, 2000).

Yokoyama et al., "10.709-Gb/s-300-km Transmission of PLC-based Chirp-Managed Laser Packaged in Pluggable Transceiver Without Any Optical or Electrical Dispersion Compensation," 34th European Conference on Optical Communication, pp. 1-2, Brussels, Belgium, Institute of Electrical Electronic Engineers, New York, New York (Sep. 21-25, 2008).

* cited by examiner

A first waveguide receives, through a first port, an optical signal output by a directly modulated laser corresponding to the first waveguide, and couples the received optical signal to a circular waveguide group corresponding to the first waveguide /401

The circular waveguide group couples a part of optical signals in optical signals from the first waveguide corresponding to the circular waveguide group into a second waveguide, where an extinction ratio of the part of optical signals coupled to the second waveguide is greater than an extinction ratio of the optical signals from the first waveguide corresponding to the circular waveguide group /402

The second waveguide aggregates optical signals from circular waveguide groups, and outputs the aggregated optical signals /403

FIG. 11

OPTICAL TRANSMITTER AND OPTICAL TRANSMISSION METHOD

CROSS-REFERENCE TO RELATED APPLICATIONS

This application is a continuation of International Application No. PCT/CN2013/091171, filed on Dec. 31, 2013, which is hereby incorporated by reference in its entirety.

TECHNICAL FIELD

Embodiments of the present invention relate to the communications field, and in particular, to an optical transmitter and an optical transmission method.

BACKGROUND

Restricted by a chirping characteristic of a directly modulated laser (DML), in an optical communications system that supports high-speed (speed higher than 10 Gbps) and long-distance transmission (distance greater than 20 Km), the DML cannot be directly used as an optical transmission source. With a high-speed and large-capacity development trend for an optical network, advantages of low costs and low power consumption are increasingly attractive, and the DML has advantages of low costs and low power consumption.

In an existing technical solution, generally a filter is added after a DML of an optical communications system for performing spectrum shaping on an output signal of the DML, achieving purposes of controlling chirping and increasing a transmission distance.

In the prior art, however, this is mostly implemented by using a method of using discrete elements, where single-function optical elements are optically coupled by using free space. For example, a multi-cavity filter is added after a DML to implement conversion from a frequency-modulated signal to an amplitude-modulated signal, so as to achieve purposes of increasing a signal extinction ratio, controlling chirping, and implementing long distance transmission. In this implementation method, discrete elements are used; therefore, a size of an optical module is relatively large and integration is not convenient. Multiple discrete elements increase difficulty in coupling and packaging, and increase costs of coupling and packaging. If this solution is to be applied to a multi-channel transmitter, a functional element for wavelength division multiplexing further needs to be added, which further increases the size of the optical module.

SUMMARY

Embodiments of the present invention provide an optical transmitter and an optical transmission method, which are applicable to multi-channel transmission and can effectively reduce a size of an optical transmitter.

According to a first aspect, embodiments of the present invention provide an optical transmitter, including a directly modulated laser array and a micro-ring group array, where the directly modulated laser array includes N directly modulated lasers, and the micro-ring group array includes N circular waveguide groups, N first waveguides, and one second waveguide, where the N directly modulated lasers, the N circular waveguide groups, and the N first waveguides form N optical transmission components, each optical transmission component consists of one directly modulated laser, one circular waveguide group, and one first waveguide, the circular waveguide group includes at least one circular waveguide, and N is greater than or equal to 2;

each directly modulated laser is configured to output an optical signal, where wavelengths of optical signals output by the directly modulated lasers are different from each other;

each first waveguide is coupled with one side of a corresponding circular waveguide group, each first waveguide includes a first port and a second port, and each first waveguide is configured to receive, through the first port, an optical signal output by a directly modulated laser corresponding to the first waveguide, and couple the received optical signal to the circular waveguide group corresponding to the first waveguide;

one side of each circular waveguide group is coupled with a first waveguide corresponding to the circular waveguide group, and the other side is coupled with the second waveguide, and each circular waveguide group is configured to couple a part of optical signals from the first waveguide corresponding to the circular waveguide group to the second waveguide, where an extinction ratio of the part of optical signals that are coupled to the second waveguide is greater than an extinction ratio of the optical signals from the first waveguide corresponding to the circular waveguide group; and the second waveguide is configured to aggregate optical signals from the circular waveguide groups, and output an aggregated optical signals.

In a first possible implementation manner, the optical transmitter may further includes N control components, where each control component is corresponding to one optical transmission component;

each control component includes one first monitor photo detector, one second monitor photo detector, and one feedback control circuit;

the circular waveguide group is further configured to couple a remaining part of optical signals in the optical signals from the first waveguide corresponding to the circular waveguide group to the second port;

each first monitor photo detector is configured to detect a strength of optical signals output by a directly modulated laser corresponding to the first monitor photo detector in the optical transmitter, and input a detection result into a corresponding feedback control circuit;

each second monitor photo detector is connected to a second port of a first waveguide corresponding to the second monitor photo detector, and the second monitor photo detector is configured to detect a strength of the remaining part of optical signals, and input a detection result into the corresponding feedback control circuit; and the feedback control circuit is configured to control a resonant wavelength of the circular waveguide group according to the detection results input by the first monitor photo detector and the second monitor photo detector.

According to the first possible implementation manner of the first aspect, in a second possible implementation manner, a heating electrode is provided in each circular waveguide group; and the feedback control circuit is further configured to:
control the resonant wavelength of the circular waveguide group by controlling a current input into a heating electrode in the circular waveguide group corresponding to the feedback control circuit.

According to the second possible implementation manner of the first aspect, in a third possible implementation manner, the feedback control circuit is further configured to:

when a strength ratio is greater than a preset strength ratio, increase the current input into the heating electrode in the circular waveguide group corresponding to the feedback control circuit, where the strength ratio is a ratio of the strength of optical signals detected by the first monitor photo detector corresponding to the feedback control circuit to the strength of optical signals detected by the second monitor photo detector corresponding to the feedback control circuit; and when the strength ratio is less than the preset strength ratio, decrease the current input into the heating electrode in the circular waveguide group corresponding to the feedback control circuit.

According to the first aspect, or the first possible implementation manner, the second possible implementation manner, or the third possible implementation manner of the first aspect, in a fourth possible implementation manner, wavelengths of the part of optical signals that are coupled to the second waveguide by each circular waveguide group fall within a preset range of the resonant wavelength of the circular waveguide group, where resonant wavelengths of circular waveguides in each circular waveguide group are equal.

According to a second aspect, embodiments of the present invention provide an optical transmission method, including:

receiving, by a first waveguide through a first port, an optical signal output by a directly modulated laser corresponding to the first waveguide, and coupling the received optical signal to a circular waveguide group corresponding to the first waveguide, where each first waveguide is coupled with one side of a corresponding circular waveguide group, each first waveguide includes a first port and a second port, and N directly modulated lasers, N circular waveguide groups, and N first waveguides form N optical transmission components, where each optical transmission component consists of one directly modulated laser, one circular waveguide group, and one first waveguide, the circular waveguide group includes at least one circular waveguide, and N is greater than or equal to 2;

coupling, by the circular waveguide group, a part of optical signals from the first waveguide corresponding to the circular waveguide group to a second waveguide, where an extinction ratio of the part of optical signals coupled to the second waveguide is greater than an extinction ratio of the optical signals from the first waveguide corresponding to the circular waveguide group, where one side of each circular waveguide group is coupled with a first waveguide corresponding to the circular waveguide group, and the other side is coupled with the second waveguide; and aggregating, by the second waveguide, optical signals from the circular waveguide groups, and outputting an aggregated optical signals.

In a first possible implementation manner, the circular waveguide group couples a remaining part of optical signals in the optical signals from the first waveguide corresponding to the circular waveguide group to the second port, so that a feedback control circuit controls a resonant wavelength of the circular waveguide group according to a strength of the remaining part of optical signals that is detected by a second monitor photo detector corresponding to the feedback control circuit and a strength of the part of optical signals that is detected by a first monitor photo detector, where each circular waveguide group is corresponding to one first monitor photo detector, one second monitor photo detector, and one feedback control circuit, and each second monitor photo detector is connected to a second port of a first waveguide corresponding to the second monitor photo detector.

According to the second aspect, or the first possible implementation manner of the second aspect, in a second possible implementation manner, wavelengths of the part of optical signals in the optical signals from the first waveguide corresponding to the circular waveguide group fall within a preset range of the resonant wavelength of the circular waveguide group, where resonant wavelengths of circular waveguides in each circular waveguide group are equal.

It can be seen from the foregoing technical solutions that the embodiments of the present invention have the following advantages:

In the embodiments of the present invention, a directly modulated laser array is used to implement multi-channel transmission, where each directly modulated laser is correspondingly provided with one circular waveguide group and one first waveguide, each circular waveguide group may couple a part of optical signals output by a directly modulated laser corresponding to the circular waveguide group to a same second waveguide, and the second waveguide aggregates optical signals from circular waveguide groups and outputs the aggregated optical signals, which effectively reduces a quantity of elements, reduces a size of an optical transmitter, and reduces costs.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

FIG. 11 is a flowchart of an optical transmission method according to an embodiment of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present disclosure.

The embodiments of the present invention provide an optical transmitter, which is applicable to multi-channel transmission, and can effectively reduce a size of an optical transmitter and reduce costs, and in addition, further provide a corresponding optical transmission method. Referring to FIG. 1 to FIG. 11, detailed descriptions are given below respectively.

Embodiment 1

Figure 1:
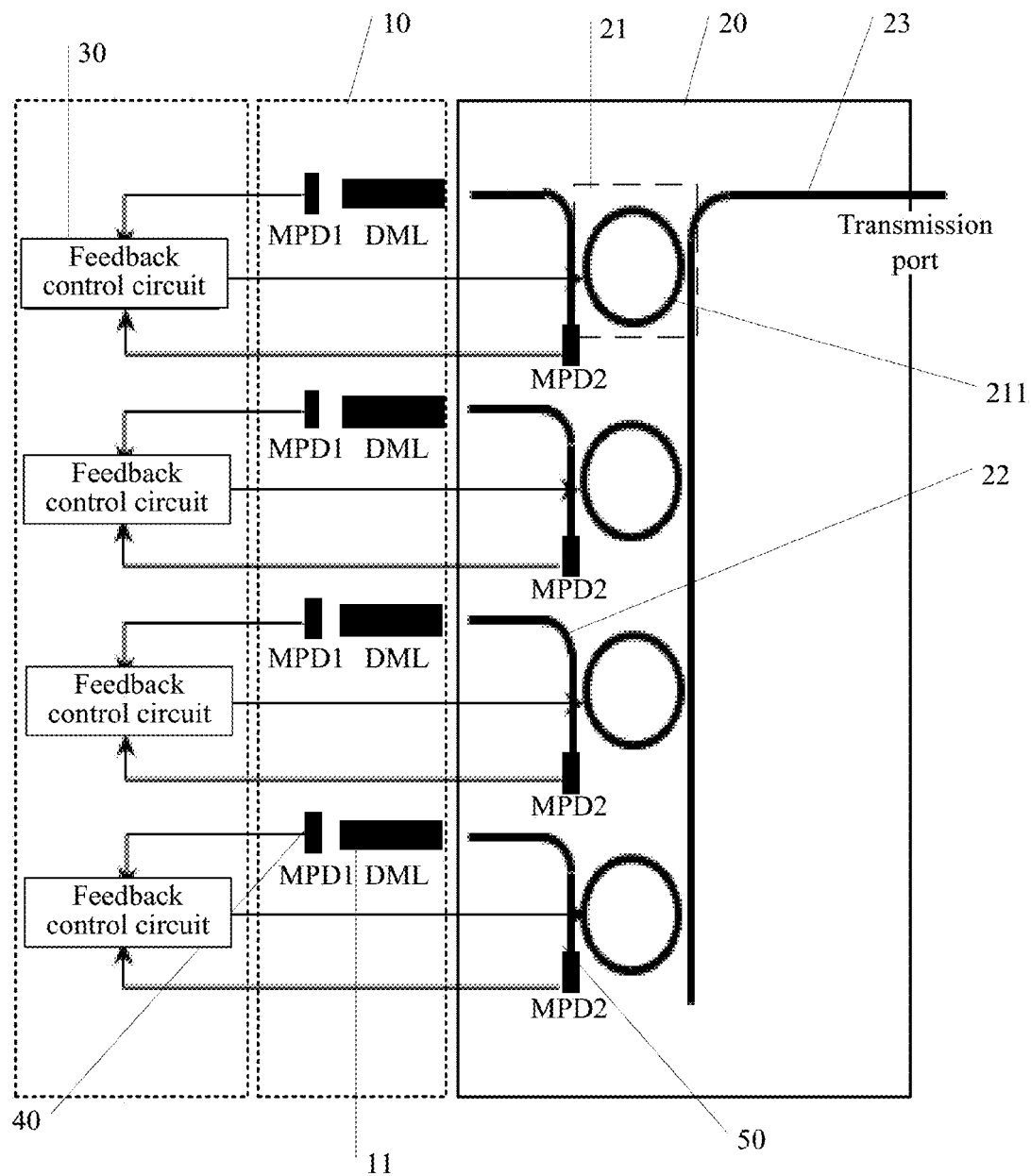
FIG. 1 is a schematic structural diagram of an optical transmitter according to an embodiment of the present invention.

This embodiment of the present invention provides an optical transmitter, which is applicable to a high-speed, long-distance transmission optical communication system. Referring to FIG. 1, FIG. 1 is a schematic structural diagram of an optical transmitter according to this embodiment of the present invention, which may be specifically as follows:

An optical transmitter includes a directly modulated laser array 10 and a micro-ring group array 20, where the directly modulated laser array 10 includes N directly modulated lasers 11, and the micro-ring group array 20 includes N circular waveguide groups 21, N first waveguides 22, and one second waveguide 23, where the N directly modulated lasers 11, the N circular waveguide groups 21, and the N first waveguides 22 form N optical transmission components, each optical transmission component consists of one directly modulated laser 11, one circular waveguide group 21, and one first waveguide 22, the circular waveguide group 21 includes at least one circular waveguide 211, and N is greater than or equal to 2; each directly modulated laser 11 is configured to output an optical signal, where wavelengths of optical signals output by the directly modulated lasers 11 are different from each other; each first waveguide 22 is coupled with one side of a corresponding circular waveguide group 21, each first waveguide 22 includes a first port 221 and a second port 222, and each first waveguide 22 is configured to receive, through the first port 221, an optical signal output by a directly modulated laser 11 corresponding to the first waveguide 22, and couple the received optical signal to the circular waveguide group 21 corresponding to the first waveguide 22; one side of each circular waveguide group 21 is coupled with a first waveguide 22 corresponding to the circular waveguide group 21, and the other side is coupled with the second waveguide 23, and each circular waveguide group 21 is configured to couple a part of optical signals in optical signals from the first waveguide 22 corresponding to the circular waveguide group 21 to the second waveguide 23, where an extinction ratio of the part of optical signals that are coupled to the second waveguide 23 is greater than an extinction ratio of the optical signals from the first waveguide 22 corresponding to the circular waveguide group 21; and the second waveguide 23 is configured to aggregate optical signals from the circular waveguide groups 21, and output the aggregated optical signals.

The directly modulated laser array 10 in this embodiment of the present invention may include N directly modulated lasers 11 (DML), where N is greater than or equal to 2. Each DML in the directly modulated laser array 10 may output an optical signal into the micro-ring group array 20, and wavelengths of optical signals output by the DMLs are different from each other.

The micro-ring group array 20 in this embodiment of the present invention may receive optical signals output by the directly modulated laser array 10, aggregate a part of optical signals in the optical signals received from the DMLs, and output the aggregated optical signals. The micro-ring group array 20 may include N circular waveguide groups 21, N first waveguides 22, and one second waveguide 23, where N is greater than or equal to 2, and a circular waveguide group 21 may include at least one circular waveguide 211.

In the optical transmitter in this embodiment of the present invention, the N directly modulated lasers 11, the N circular waveguide groups 21, and the N first waveguides 22 form the N optical transmission components, where N is greater than or equal to 2, and each optical transmission component consists of one directly modulated laser 11, one circular waveguide group 21, and one first waveguide 22. Each first waveguide 22 is coupled with one side of a corresponding circular waveguide group 21, each first waveguide 22 includes a first port 221 and a second port 222, one side of each circular waveguide group 21 is coupled with a first waveguide 22 corresponding to the circular waveguide group 21, and the other side is coupled with the second waveguide 23.

In each optical transmission component, a directly modulated laser 11 outputs an optical signal into a first waveguide 22 corresponding to the directly modulated laser 11, the first waveguide 22 receives the optical signal through a first port 221, and couples the received optical signal to a circular waveguide group 21 corresponding to the first waveguide 22, the circular waveguide group 21 couples a part of optical signals in optical signals from the first waveguide 22 to the second waveguide 23, where an extinction ratio of the part of optical signals coupled to the second waveguide 23 is greater than an extinction ratio of optical signals that are received by the first waveguide 22 through the first port 221.

The second waveguide 23 may aggregate optical signals that are coupled by the circular waveguide groups 21 in the optical transmission components, and output the aggregated optical signals to a transmission port of the optical transmitter.

It can be known from the above that, in this embodiment of the present invention, a directly modulated laser array is used to implement multi-channel transmission, where each directly modulated laser is correspondingly provided with one circular waveguide group and one first waveguide, each circular waveguide group may couple a part of optical signals output by a directly modulated laser corresponding to the circular waveguide group to a same second waveguide, and the second waveguide aggregates optical signals from circular waveguide groups and outputs the aggregated optical signals. The micro-ring group array implements not only filtering but also multiplexing, which effectively reduces a quantity of elements, reduces a size of an optical transmitter, and reduces costs.

Embodiment 2

On the basis of Embodiment 1, this embodiment of the present invention may further include a control component, where the control component may control a resonant wavelength of the circular waveguide group 21. Referring to FIG. 1, FIG. 1 is a schematic structural diagram of an optical transmitter according to this embodiment of the present invention, which may be specifically as follows:

Generally, a refractive index of the circular waveguide group 21 changes with a temperature. When a temperature of the circular waveguide group 21 changes, the refractive index of the circular waveguide group 21 changes, and therefore the resonant wavelength of the circular waveguide group 21 also changes. This phenomenon is known as the thermo-optic effect. In an actual application, both a wavelength of a DML and the resonant wavelength of the circular waveguide group 21 change with a change in the environment, such as an operating temperature. In order to avoid that the circular waveguide group 21 cannot couple an optical signal output by the DML to the second waveguide 23 because the resonant wavelength of the circular waveguide group 21 changes due to occurrence of the thermo-optic effect, in this embodiment of the present invention, a control component may be provided to control the resonant wavelength of the circular waveguide group 21, so that the resonant wavelength of the circular waveguide group 21 falls within a wavelength range of the optical signal output by the DML. For example, it may be specifically as follows:

The optical transmitter in this embodiment of the present invention may further include N control components, where each control component is corresponding to one optical transmission component; each control component includes one feedback control circuit 30 and two monitor photo detectors (MPD). For ease of description, the two monitor photo detectors may be respectively described as a first monitor photo detector 40 (MPD1) and a second monitor photo detector 50 (MPD2). The two MPDs may respectively detect a strength of optical signals output by a DML and a strength of optical signals that are coupled to a second port 222 by a circular waveguide group 21. For example, it may be specifically as follows:

Each MPD1 is configured to detect a strength of optical signals output by a DML corresponding to the MPD1 in the optical transmitter, obtain a detection result, and input the detection result into a corresponding feedback control circuit 30. It should be noted that, each DML has two end faces, where one end face is configured to output optical signals to an MPD1, and the MPD1 detects power of the optical signals output by this end face, and the other end face is configured to output optical signals to a first port 221 of a first waveguide 22. Output power of the optical signals output by the two end faces of the DML is in a proportional relationship, and the output power is in direct proportion to reflectivity of the end face of the DML. For each DML, the two end faces have preset reflectivity, where reflectivity of one end face is far greater than reflectivity of the other end face, and because of characteristics of the MPD1 and the first waveguide 22, a proportion of optical signals output to the first port 221 is inevitably far greater than that of optical signals output to the MPD1.

It can be known from Embodiment 1 that, each circular waveguide group 21 may couple a part of optical signals in optical signals from a first waveguide 22 corresponding to the circular waveguide group 21 to the second waveguide 23. In addition, the circular waveguide group 21 may also couple a remaining part of optical signals in the optical signals from the first waveguide 22 corresponding to the circular waveguide group 21 to a second port 222. Each MPD2 is connected to a second port 222 of a first waveguide 22 corresponding to the MPD2. That is, an optical signal transmitted by a DML may have the following transmission paths:

DML→first waveguide→circular waveguide→second port; and

DML→first waveguide→circular waveguide→second waveguide.

An extinction ratio of the optical signals that are coupled to the second waveguide by the circular waveguide is greater than an extinction ratio of optical signals that are coupled from the first waveguide. It should be noted that, wavelengths of the part of optical signals coupled to the second waveguide 23 fall within a range of a resonant wavelength of the circular waveguide group 21, where resonant wavelengths of circular waveguides 211 in each circular waveguide group 21 are equal. The wavelengths of the part of optical signals coupled to the second waveguide 23 have a preset range, which is specifically described in detail in the following embodiments, and is not described herein.

Each MPD2 is configured to detect a strength of a remaining part of optical signals coupled by the circular waveguide group 21 corresponding to the MPD2, obtain a detection result, and input the detection result into the corresponding feedback control circuit 30.

The feedback control circuit 30 is configured to control the resonant wavelength of the circular waveguide group 21 according to the detection results input by the foregoing MPD1 and MPD2.

Figure 2:
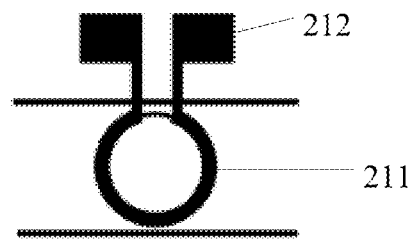
FIG. 2 is a schematic structural diagram of a circular waveguide group according to an embodiment of the present invention.
Figure 3:
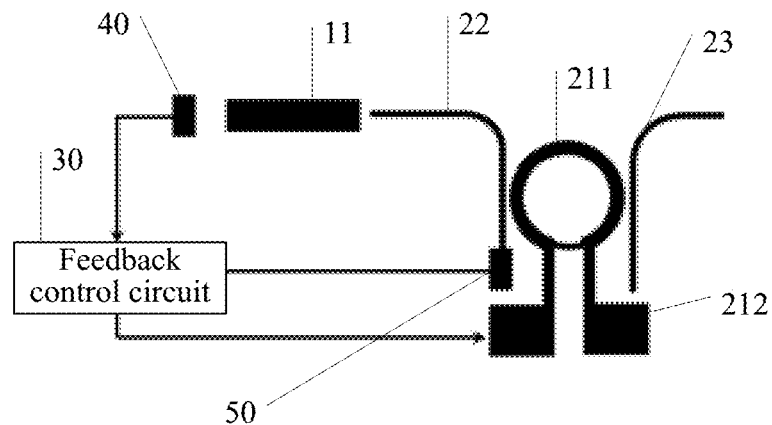
FIG. 3 is a schematic structural diagram of a circular waveguide group and a control component according to an embodiment of the present invention.

Specifically, the feedback control circuit 30 may control the resonant wavelength of the circular waveguide group 21 in the following manner:

A heating electrode 212 may be provided in the circular waveguide group 21. Referring to FIG. 2, FIG. 2 is a schematic structural diagram of a circular waveguide group. FIG. 3 is a schematic structural diagram of a circular waveguide group and a control component, where the circular waveguide group 21 includes one circular waveguide 211. If the circular waveguide group 21 includes two or more circular waveguides 211, one heating electrode may be provided in the circular waveguide group 21, or one heating electrode may be separately provided in each circular waveguide 211, and the heating electrode on each circular waveguide 211 is controlled by using a same feedback control circuit, so as to ensure that currents input into circular waveguides 211 in the same circular waveguide group 21 are equal in magnitude.

The heating electrode 212 is provided in the circular waveguide group 21, and the feedback control circuit 30 may control a temperature of the circular waveguide group 21 by controlling a current input into the heating electrode 212 in the circular waveguide group 21 corresponding to the feedback control circuit 30, and adjust an effective refractive index of the circular waveguide group 21, so as to control the resonant wavelength of the circular waveguide group 21.

The feedback control circuit 30 may acquire in advance magnitude of photocurrents input into the feedback control circuit by the MPD1 and the MPD2 that are corresponding to the feedback control circuit 30, and magnitude of the current loaded on the heating electrode 212 in the circular waveguide group 21 corresponding to the feedback control circuit 30. The feedback control circuit 30 may perform a division operation on the foregoing acquired magnitude of the photocurrents input into the feedback control circuit 30 by the MPD1 and the MPD2 to obtain a ratio, where in this embodiment, the ratio may be described as a preset strength ratio. Because both the resonant wavelength of the circular waveguide group 21 and a wavelength of an optical signal output by the DML have distributions, when external environment changes, it causes that an offset occurs between the resonant wavelength of the circular waveguide group 21 and the wavelength of the optical signal output by the DML. When an optimum operating state is departed, the ratio of the photocurrents input into the feedback control circuit 30 by the MPD1 and MPD2 changes, in which case the feedback control circuit 30 may learn that the ratio has changed, so as to control the resonant wavelength of the circular waveguide group 21. For example, it may be specifically as follows:

The MPD1 and the MPD2 may detect a strength of optical signals, and send detection results to the feedback control circuit 30 by using a photocurrent signal, the foregoing photocurrent signal is used as a feedback input signal for the feedback control circuit 30, and the feedback control circuit 30 may output a control signal according to the received photocurrent signal to control the resonant wavelength of the circular waveguide group 21. Then it can be learned, from a ratio of the strength of optical signals that is detected by the MPD1 to the strength of optical signals that is detected by the MPD2, whether an offset occurs between the resonant wavelength of the circular waveguide group 21 and the wavelength of the optical signal output by the DML.

Assuming that the ratio of the strength of optical signals that is detected by the MPD1 to the strength of optical signals that is detected by the MPD2 is a strength ratio S, where the MPD1 and the MPD2 are corresponding to the feedback control circuit 30, when S is greater than the preset strength ratio, it is indicated that optical signals that are coupled to the second port 222 of the first waveguide 22 by the circular waveguide group 21 are excessively strong, and optical signals that are coupled to the second waveguide 23 by the circular waveguide group 21 are excessively weak, that is, the resonant wavelength of the circular waveguide group 21 is excessively small relative to the output wavelength of the DML. In this case, the feedback control circuit 30 increases the current input into the heating electrode 212 in the circular waveguide group 21 corresponding to the feedback control circuit 30, so that the resonant wavelength of the circular waveguide group 21 shifts toward a long-wavelength direction to ensure an optimum operating state of the circular waveguide group 21.

When S is less than the preset strength ratio, the feedback control circuit 30 decreases the current input into the heating electrode in the circular waveguide group 21 corresponding to the feedback control circuit 30, so that the resonant wavelength of the circular waveguide group 21 shifts toward a short-wavelength direction, ensuring that the entire optical transmitter operates in an optimum state.

When S is equal to the preset strength ratio, it is indicated that the circular waveguide group 21 is in a normal operating state, and a part of optical signals in optical signals from the first waveguide 22 corresponding to the circular waveguide group 21 may be coupled to the second waveguide 23, and a remaining part of optical signals are coupled to the second port 222 of the first waveguide 22, where an extinction ratio of the part of optical signals coupled to the second waveguide 23 is greater than an extinction ratio of the optical signals from the first waveguide 22 corresponding to the circular waveguide group 21, and wavelengths of the part of optical signals coupled to the second waveguide 23 fall within a preset range of the resonant wavelength of the circular waveguide group 21.

It can be known from the above that, in this embodiment of the present invention, a directly modulated laser array is used to implement multi-channel transmission, where each directly modulated laser is correspondingly provided with one circular waveguide group and one first waveguide, each circular waveguide group may couple a part of optical signals output by a directly modulated laser corresponding to the circular waveguide group to a same second waveguide, and the second waveguide aggregates optical signals from circular waveguide groups and outputs the aggregated optical signals. The micro-ring group array implements not only filtering but also multiplexing, which effectively reduces a quantity of elements, reduces a size of an optical transmitter, and reduces costs. Further, a control component is also used to control a resonant wavelength of the circular waveguide group, which ensures an optimum operating state of the circular waveguide group, and thereby ensures that the entire optical transmitter operates in an optimum state. A heating electrode is provided in the circular waveguide group. The micro-ring group array implements photo-electricity integration, which further reduces the size of the optical transmitter, and effectively reduces power consumption.

Embodiment 3

The following describes in detail an optical transmitter in this embodiment of the present invention by using a specific application example. The optical transmitter includes four optical transmission components, and each circular waveguide group 21 includes one circular waveguide 211. Specifically, reference may be made to FIG. 1, where FIG. 1 is a schematic structural diagram of the optical transmitter in this embodiment of the present invention.

Figure 4:
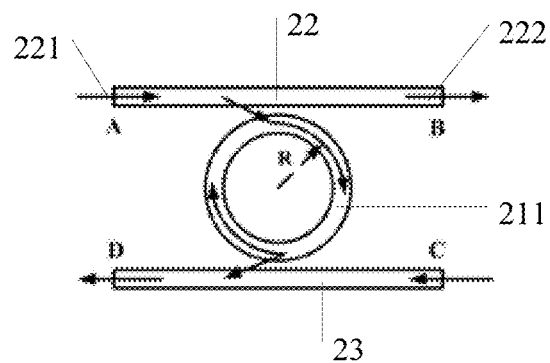
FIG. 4 is a schematic structural diagram of one micro-ring group of a micro-ring group array according to an embodiment of the present invention.
Figure 5:
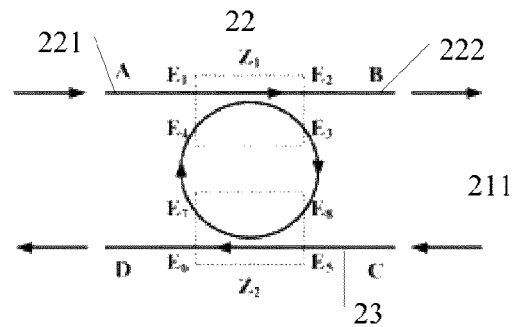
FIG. 5 is another schematic structural diagram of one micro-ring group of a micro-ring group array according to an embodiment of the present invention.
Figure 6:
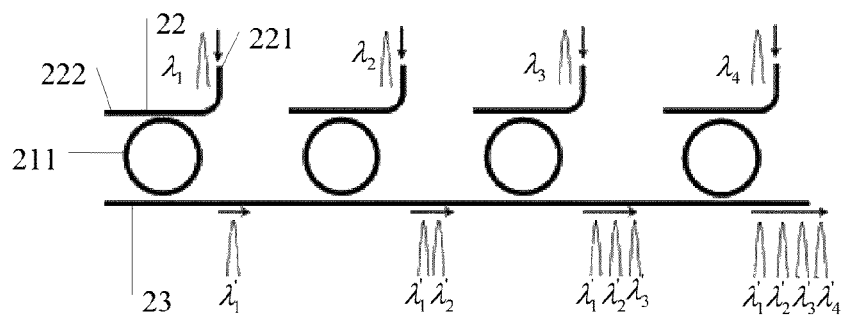
FIG. 6 is a schematic structural diagram of a micro-ring group array according to an embodiment of the present invention.

The micro-ring group array 20 includes four circular waveguide groups 21, four first waveguides 22, and one second waveguide 23, one circular waveguide group 21 includes one circular waveguide 211, and each optical transmission component includes one DML, one circular waveguide 211, and one first waveguide 22. In an optical transmission component, when a distance between a circular waveguide 211 and a first waveguide 22 is relatively small, an optical signal transmitted in the first waveguide 22 is coupled to the circular waveguide 211, and similarly, an optical signal transmitted in the circular waveguide 211 is also coupled to the first waveguide 22. Similarly, when a distance between the circular waveguide 211 and the second waveguide 23 is relatively small, an optical signal transmitted in the circular waveguide 211 is coupled to the second waveguide 23. Referring to FIG. 4, FIG. 5, and FIG. 6, FIG. 4 is a schematic structural diagram of one micro-ring group of a micro-ring group array, FIG. 5 is another schematic structural diagram of one micro-ring group of a micro-ring group array, and FIG. 6 is a schematic structural diagram of a micro-ring group array. It should be noted that, a heating electrode 212 is not shown in FIG. 6, but the circular waveguide group 21 may be provided with a heating electrode in practice.

As shown in FIG. 5, FIG. 5 is another schematic structural diagram of one micro-ring group of a micro-ring group array. Each micro-ring group has two coupling regions, which are Z1 and Z2 respectively. When coupled in the coupling regions, an optical signal shifts $$\frac{\pi}{2}$$

in phase. Assuming that a wavelength, in vacuum, of an optical signal that is output by a directly modulated laser 11 corresponding to a first waveguide 22 and that is received by the first waveguide 22 through a first port 221 is λ, and the optical signal whose wavelength is λ is coupled to a circular waveguide 211, and after transmission in the circular waveguide 211 for one circle, a phase change is shown in an equation (1):

$$\theta = \beta \cdot 2\pi R = 4\pi^2 n_{\mathit{eff}} \frac{R}{\lambda} \tag{1}$$

where λ is the wavelength of the optical signal in vacuum, the effective refractive index $n_{\mathit{eff}}$ is a function of the wavelength, and β is a transmission constant when the optical signal is transmitted in the circular waveguide 211, where magnitude of β is equal to a transmission constant $$\frac{\pi}{2\lambda}$$

when light is transmitted in vacuum multiplied by the effective refractive index $n_{\mathit{eff}}$.

When θ=2mπ (where m is an integer), after traveling in the circular waveguide 211 for one circle, the optical signal returns to the coupling region Z1 for the first waveguide 22, and a total phase change, inclusive of phase shifts occurring in the two coupling regions Z1 and Z2, that is undergone by the optical signal during the traveling for one circle is (2m+1)π; therefore, when the optical signal returns to the coupling region Z1 after traveling for one circle, destructive interference occurs between the optical signal and an optical signal received through the first port 221 from the DML, so that after traveling for one circle, most optical signals are coupled back to the circular waveguide 211, and so on. In the coupling region Z2, the circular waveguide 211 couples a part of optical signals in optical signals from the first waveguide 22 corresponding to the circular waveguide 211 to the second waveguide 23 for outputting.

Figure 7:
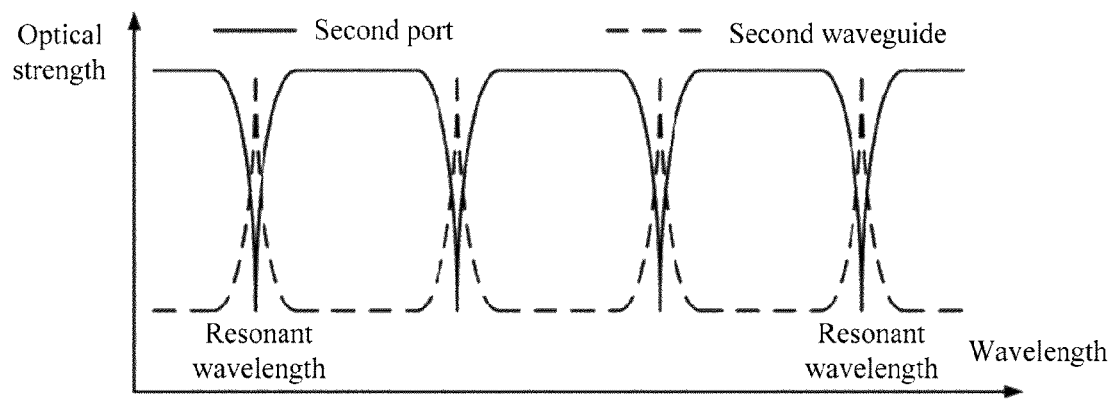
FIG. 7 is a schematic diagram of a filtering characteristic curve of a circular waveguide according to an embodiment of the present invention.

It can be known from the equation (1) that θ is related to λ; therefore, a degree of destructive interference at the coupling region Z1 are different for light of different wavelengths, resulting that optical energy allocated to the second port 222 and the second waveguide 23 is different for optical signals of different wavelengths, which presents a filtering characteristic curve shown in FIG. 7. FIG. 7 is a schematic diagram of a filtering characteristic curve of a circular waveguide, where a solid line in FIG. 7 indicates optical signals allocated to the second port, and a dashed line indicates optical signals allocated to the second waveguide.

It can be known from FIG. 7 that the filtering characteristic curve of the circular waveguide 211 presents a periodic distribution, which is because when m in θ=2mπ (where m is an integer) takes different values, a wavelength is correspondingly different, where a wavelength that makes θ=2mπ true may be referred to as a resonant wavelength, and only an optical signal with a wavelength near a resonant wavelength may be coupled to the second waveguide 23 and output. An optical signal with a wavelength near a resonant wavelength is an optical signal in a preset range.

As shown FIG. 6, FIG. 6 is a schematic structural diagram of a micro-ring group array. In the micro-ring group array 20, in each optical transmission component, a first waveguide 22 receives, through a first port 221, an optical signal output by a DML corresponding to the first waveguide 22, and couples all optical signals to a circular waveguide 211 corresponding to the first waveguide 22. For ease of description, circular waveguides 211 are described as a first circular waveguide, a second circular waveguide, a third circular waveguide, and a fourth circular waveguide from left to right. Assuming that the first waveguide 22 receives, through the first port 221, an optical signal whose wavelength is $\lambda_1$ that is output by the DML corresponding to the first waveguide 22, and couples all optical signals whose wavelengths are $\lambda_1$ to the first circular waveguide. Assuming that a resonant wavelength of the first circular waveguide is $\lambda'_1$, the first circular waveguide may couple an optical signal whose wavelength is $\lambda'_1$ to the second waveguide 23. Similarly, in another optical transmission component, assuming that a first waveguide 22 couples all optical signals whose wavelengths are $\lambda_2$ to the second circular waveguide, and assuming that a resonant wavelength of the second circular waveguide is $\lambda'_2$, the second circular waveguide may couple an optical signal whose wavelength is $\lambda'_2$ in the optical signals whose wavelengths are $\lambda_2$ to the second waveguide 23, and in a same way, the third circular waveguide may couple an optical signal whose wavelength is $\lambda'_3$ to the second waveguide 23, and the fourth circular waveguide may couple an optical signal whose wavelength is $\lambda'_4$ to the second waveguide 23. Because the resonant wavelengths of the first circular waveguide and the second circular waveguide are different, when traveling through a coupling region for the second circular waveguide and the second waveguide 23, the optical signal whose wavelength is $\lambda'_1$ is not interfered by the second circular waveguide, and may be directly output from the second waveguide 23, and similarly, when traveling through a coupling region for the third circular waveguide and the second waveguide 23, the optical signal whose wavelength is $\lambda'_2$ is not interfered by the third circular waveguide, and may be directly output from the second waveguide 23, and in a same way, the second waveguide 23 may output optical signals whose wavelengths are $\lambda'_1$, $\lambda'_2$, $\lambda'_3$, and $\lambda'_4$ that are coupled by the first circular waveguide, the second circular waveguide, the third circular waveguide, and the fourth circular waveguide.

In an actual application, in order to avoid that an inevitable situation causes an error of the resonant wavelength of the circular waveguide, the circular waveguide group 21 may be so set that the circular waveguide group 21 couples an optical signal falling within a preset range of a resonant wavelength of the circular waveguide group 21 to the second waveguide 23. For example, the first circular waveguide, the second circular waveguide, the third circular waveguide, and the fourth circular waveguide may couple optical signals whose wavelengths are $\lambda'_1+C$, $\lambda'_2+C$, $\lambda'_3+C$, and $\lambda'_4+C$ to the second waveguide 23, where C is a constant, and C has a relatively small range.

Because only an optical signal with a wavelength near the resonant wavelength may be coupled to the second waveguide 23, the circular waveguide group 21 has a quite good filtering function. In this embodiment of the present invention, different circular waveguide groups 21 are coupled with the same second waveguide 23 at one side, and because resonant wavelengths of the circular waveguide groups 21 in the optical transmitter are different from each other, wavelengths of optical signals coupled to the second waveguide 23 are different, and the second waveguide 23 may aggregate optical signals with different wavelengths that are coupled by the circular waveguide groups 21, which implements a multiplexing function, reduces a quantity of devices, and implements miniaturization of a device.

An extinction ratio of the part of optical signals that are coupled to the second waveguide 23 by the circular waveguides 211 is greater than an extinction ratio of optical signals coupled from the first waveguides 22 corresponding to the circular waveguides 211.

Figure 8:
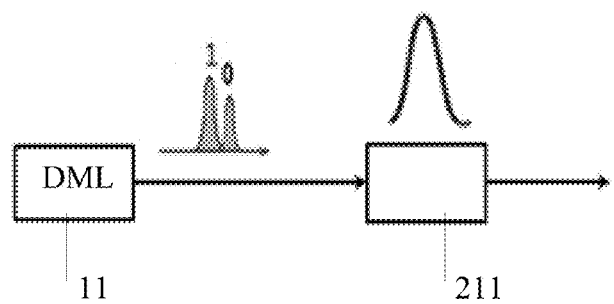
FIG. 8 is a schematic diagram of outputting an optical signal by a directly modulated laser according to an embodiment of the present invention.
Figure 9:
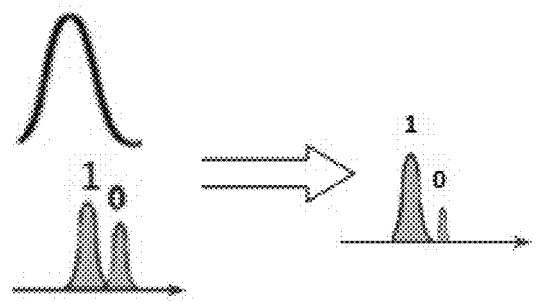
FIG. 9 is a schematic diagram of an optical signal that is output by a directly modulated laser and that is coupled to a second waveguide by a circular waveguide according to an embodiment of the present invention.

In a case of direct modulation, a chirping characteristic of a DML causes that a wavelength of the DML is different for different injected currents, where an emergent wavelength of the DML for a "1" signal is generally slightly shorter than an emergent wavelength of the DML for a "0" signal. Specifically, reference may be made to FIG. 8, where FIG. 8 is a schematic diagram of outputting an optical signal by a DML. When wavelengths of optical signals output by the DML fall at a falling edge of a circular waveguide 211, most "1" signals are not filtered out, while most "0" signals are filtered out. Therefore, after optical signals received through a first port 221 travel through the circular waveguide 211, an energy ratio of "1" signals to "0" signals becomes greater, that is, an extinction ratio increases. Specifically, reference may be made to FIG. 9, FIG. 9 is a schematic diagram of an optical signal that is output by a DML and that is coupled to the second waveguide 23 by a circular waveguide.

When environment, such as an operating temperature, changes, both a wavelength of an optical signal output by the DML and a resonant wavelength of a circular waveguide group 21 change, and when the resonant wavelength of the circular waveguide group 21 changes, magnitude of a current in a heating electrode in the circular waveguide group 21 changes. An MPD2 can detect a strength of optical signals coupled from the circular waveguide group 21 corresponding to the MPD2, and an MPD1 can detect a strength of optical signals output by the DML, in the optical transmitter, that is corresponding to the MPD1, and the foregoing two strengths have a preset strength ratio. When it is detected that a ratio of the foregoing two strengths is greater than the preset strength ratio, a feedback control circuit 30 increases a current input into the heating electrode in the circular waveguide group 21 corresponding to the feedback control circuit 30, so that the resonant wavelength of the circular waveguide group 21 shifts toward a long-wavelength direction; when the ratio of the foregoing two strengths is less than the preset strength ratio, the feedback control circuit 30 decreases the current input into the heating electrode in the circular waveguide group 21 corresponding to the feedback control circuit 30, so that the resonant wavelength of the circular waveguide group 21 shifts toward a short-wavelength direction.

Figure 10:
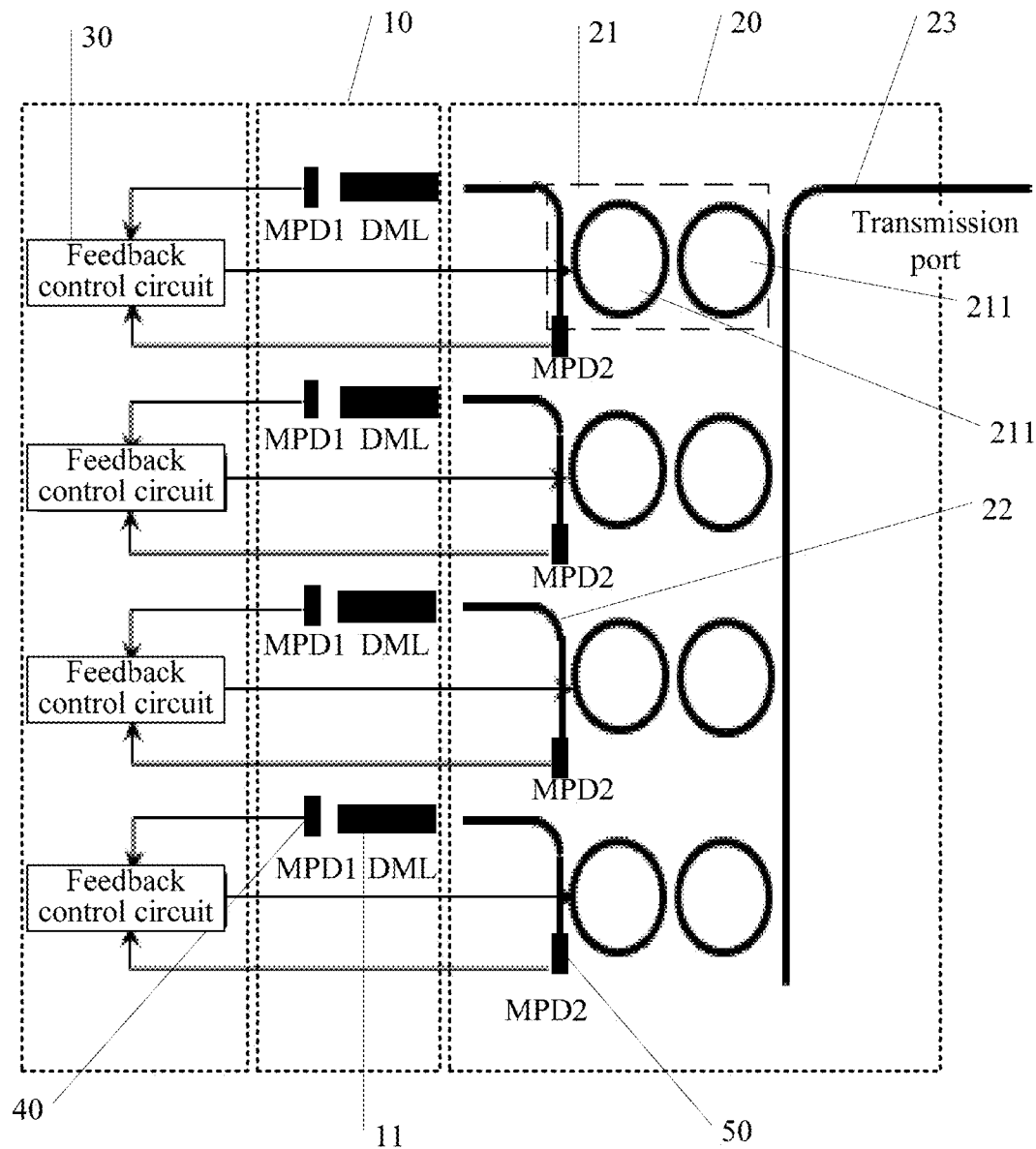
FIG. 10 is another schematic structural diagram of an optical transmitter according to an embodiment of the present invention.

In the foregoing application example, each circular waveguide group 21 includes one circular waveguide 211, but in an actual application, two or more circular waveguides 211 may be used in the circular waveguide group 21 to achieve a better filtering effect. For example, two circular waveguides 211 may be provided in each circular waveguide group 21. Specifically, reference may be made to FIG. 10, where FIG. 10 is another schematic structural diagram of an optical transmitter according to an embodiment of the present invention.

The micro-ring group array in this embodiment of the present invention implements not only filtering but also multiplexing, which effectively reduces a quantity of elements, reduces a size of an optical transmitter, and reduces costs. Embodiments of the present invention further use a control component to control a resonant wavelength of a circular waveguide group, which ensures an optimum operating state of the circular waveguide group, and thereby ensures that the entire optical transmitter operates in an optimum state. A heating electrode is provided in the circular waveguide group. The micro-ring group array implements photo-electricity integration, which further reduces the size of the optical transmitter, and effectively reduces power consumption.

Embodiment 4

For better understanding of the foregoing technical solutions, this embodiment of the present invention further provides an optical transmission method, which may be specifically as follows:

An optical transmission method includes: receiving, by a first waveguide through a first port, an optical signal output by a directly modulated laser corresponding to the first waveguide, and coupling the received optical signal to a circular waveguide group corresponding to the first waveguide, where each first waveguide is coupled with one side of a corresponding circular waveguide group, each first waveguide includes a first port and a second port, and N directly modulated lasers, N circular waveguide groups, and N first waveguides form N optical transmission components, where each optical transmission component consists of one directly modulated laser, one circular waveguide group, and one first waveguide, the circular waveguide group includes at least one circular waveguide, and N is greater than or equal to 2; and coupling, by the circular waveguide group, a part of optical signals in optical signals from the first waveguide corresponding to the circular waveguide group to a second waveguide, where an extinction ratio of the part of optical signals coupled to the second waveguide is greater than an extinction ratio of the optical signals from the first waveguide corresponding to the circular waveguide group, where one side of each circular waveguide group is coupled with a first waveguide corresponding to the circular waveguide group, and the other side is coupled with the second waveguide; and aggregating, by the second waveguide, optical signals from the circular waveguide groups, and outputting the aggregated optical signals.

Referring to FIG. 11, FIG. 11 is a flowchart of the optical transmission method in this embodiment of the present invention, where specific steps may be as follows:

401: A first waveguide receives, through a first port, an optical signal output by a directly modulated laser corresponding to the first waveguide, and couples the received optical signal to a circular waveguide group corresponding to the first waveguide.

Each first waveguide is coupled with one side of a corresponding circular waveguide group, and each first waveguide includes a first port and a second port. N directly modulated lasers, N circular waveguide groups, and N first waveguides form N optical transmission components, where each optical transmission component consists of one directly modulated laser, one circular waveguide group, and one first waveguide, the circular waveguide group includes at least one circular waveguide, and N is greater than or equal to 2.

For example, the micro-ring group array may include four circular waveguide groups, four first waveguides, and one second waveguide 23, one circular waveguide group includes one circular waveguide, and each optical transmission component includes one DML, one circular waveguide, and one first waveguide. In an optical transmission component, when a distance between a circular waveguide and a first waveguide is relatively small, an optical signal transmitted in the first waveguide is coupled to the circular waveguide, and similarly, an optical signal transmitted in the circular waveguide is also coupled to the first waveguide. Similarly, when a distance between the circular waveguide and the second waveguide is relatively small, an optical signal transmitted in the circular waveguide is coupled to the second waveguide. Specifically, reference may be made to the foregoing embodiments, and details are not described herein again.

402: The circular waveguide group couples a part of optical signals in optical signals from the first waveguide corresponding to the circular waveguide group to a second waveguide, where an extinction ratio of the part of optical signals coupled to the second waveguide is greater than an extinction ratio of the optical signals from the first waveguide corresponding to the circular waveguide group.

One side of each circular waveguide group is coupled with a first waveguide corresponding to the circular waveguide group, and the other side is coupled with the second waveguide.

Wavelengths of the part of optical signals in the optical signals from the first waveguide corresponding to the circular waveguide group fall within a preset range of a resonant wavelength of the circular waveguide group, where resonant wavelengths of circular waveguides in each circular waveguide group are equal.

403: The second waveguide aggregates optical signals from circular waveguide groups, and outputs the aggregated optical signals.

In addition, the following step may further be included: coupling, by the circular waveguide group, a remaining part of optical signals in the optical signals from the first waveguide corresponding to the circular waveguide group to the second port, which, for example, may be as follows:

The circular waveguide group couples the remaining part of optical signals in the optical signals from the first waveguide corresponding to the circular waveguide group to the second port, which may enable a feedback control circuit to control a resonant wavelength of the circular waveguide group according to a strength of the remaining part of optical signals that is detected by a second optical detector corresponding to the feedback control circuit and a strength of the part of optical signals that is detected by a first optical detector corresponding to the feedback control circuit, where each circular waveguide group is corresponding to one first optical detector, one second optical detector, and one feedback control circuit, and each second optical detector is connected to a second port of a first waveguide corresponding to the second optical detector.

It should be noted that, for specific implementation in this embodiment of the present invention, reference may be made to the foregoing embodiments, and details are not described herein again.

It can be known from above that, in this embodiment of the present invention, a first waveguide is used to receive, through a first port, an optical signal output by a directly modulated laser corresponding to the first waveguide, and couple the received optical signal to a circular waveguide group corresponding to the first waveguide, and the circular waveguide group couples a part of optical signals in optical signals from the first waveguide corresponding to the circular waveguide group to a second waveguide, where an extinction ratio of the part of optical signals coupled to the second waveguide is greater than an extinction ratio of the optical signals from the first waveguide corresponding to the circular waveguide group, and the second waveguide aggregates optical signals from circular waveguide groups, and outputs the aggregated optical signals. In this way, not only filtering but also multiplexing are implemented, which effectively reduces a quantity of elements, reduces a size of an optical transmitter, and reduces costs.

An optical transmitter and an optical transmission method provided by the embodiments of the present invention are described in detail above. In this specification, specific examples are used to describe the principle and implementation manners of the embodiments of the present invention, and the description of the foregoing embodiments is only intended to help understand the method and core idea of the present disclosure. Meanwhile, a person skilled in the art may, based on the idea of the embodiments of the present invention, make modifications with respect to the specific implementation manners and the application scope. Therefore, the content of this specification shall not be construed as a limitation to the specific embodiments of the disclosure.

What is claimed is:

1. An optical transmitter comprising:
   a directly modulated laser array comprising N directly modulated lasers;
   a micro-ring group array comprising N circular waveguide groups, N first waveguides, and a second waveguide;
   N optical transmission components comprising the N directly modulated lasers, the N circular waveguide groups, and the N first waveguides, each optical transmission component consisting of a directly modulated laser, and a first waveguide, and a circular waveguide group comprising at least one circular waveguide, and N being greater than or equal to 2;
   N control components, each of which comprising (a) a first monitor photo detector configured to detect a strength of optical signals output by a directly modulated laser associated with the first monitor photo detector in the optical transmitter, and input a detection result into an associated feedback control circuit, (b) a second monitor photo detector configured to detect a strength of the remaining part of optical signals, and connect to a second port of a first waveguide associate with the second monitor photo detector, and input a detection result into the associated feedback control circuit, and (c) a feedback control circuit configured to control a resonant wavelength of one of the circular waveguide groups according to the detection results input by the first and second monitor photo detectors;
   each directly modulated laser configured to output an optical signal, wherein wavelengths of optical signals output by the directly modulated lasers are different from each other;
   each first waveguide coupled with one side of a corresponding circular waveguide group;
   each first waveguide comprising a first port and a second port configured to receive, through the first port, an optical signal output by a directly modulated laser corresponding to the first waveguide, and to couple the received optical signal to the circular waveguide group corresponding to the first waveguide;
   one side of each circular waveguide group coupled with a first waveguide corresponding to the circular waveguide group, and the other side coupled with the second waveguide, wherein each circular waveguide group is configured to couple a part of optical signals from the first waveguide corresponding to the circular waveguide group to the second waveguide;
   each of the circular waveguide groups configured to couple a remaining part of optical signals in the optical signals from the first waveguide corresponding to the circular waveguide group to the second port, wherein an extinction ratio of the part of optical signals coupled to the second waveguide is greater than an extinction ratio of the optical signals from the first waveguide associated with the circular waveguide group; and the second waveguide configured to aggregate optical signals from the circular waveguide groups, and output an aggregated optical signal.

2. The optical transmitter according to claim 1, wherein a heating electrode is provided in each circular waveguide group; and the feedback control circuit is further configured to control the resonant wavelength of the circular waveguide group by controlling a current input into a heating electrode in the circular waveguide group corresponding to the feedback control circuit.

3. The optical transmitter according to claim 2, wherein the feedback control circuit is further configured to:

when a strength ratio is greater than a preset strength ratio, increase the current input into the heating electrode in the circular waveguide group corresponding to the feedback control circuit, wherein the strength ratio is a ratio of the strength of optical signals detected by the first monitor photo detector corresponding to the feedback control circuit to the strength of optical signals detected by the second monitor photo detector corresponding to the feedback control circuit; and when the strength ratio is less than the preset strength ratio, decrease the current input into the heating electrode in the circular waveguide group corresponding to the feedback control circuit.

4. The optical transmitter according to claim 1, wherein wavelengths of the part of optical signals that are coupled to the second waveguide by each circular waveguide group fall within a preset range of the resonant wavelength of the circular waveguide group, wherein resonant wavelengths of circular waveguides in each circular waveguide group are equal.

5. An optical transmission method comprising:

receiving, by a first waveguide through a first port, an optical signal output by a directly modulated laser corresponding to the first waveguide, and coupling the received optical signal to a circular waveguide group corresponding to the first waveguide;

coupling, by the circular waveguide group, a part of optical signals from the first waveguide corresponding to the circular waveguide group to a second waveguide, wherein an extinction ratio of the part of optical signals coupled to the second waveguide is greater than an extinction ratio of the optical signals from the first waveguide associated with the circular waveguide group;

aggregating, by the second waveguide, optical signals from the circular waveguide groups, and outputting an aggregated optical signals;

coupling, by the circular waveguide group of a first waveguide, a remaining part of the optical signals from the first waveguide; and controlling, by a feedback control circuit, a resonant wavelength of the circular waveguide group according to a strength of the remaining part of optical signals that is detected by a second monitor photo detector corresponding to the feedback control circuit and a strength of the part of optical signals that is detected by a first monitor photo detector, wherein each circular waveguide group is associated with a first monitor photo detector, a second monitor photo detector, and a feedback control circuit, and each second monitor photo detector is connected to a second port of a first waveguide corresponding to the second monitor photo detector.

6. The optical transmission method according to claim 5, further comprising wavelengths of the part of optical signals in the optical signals from the first waveguide corresponding to the circular waveguide group fall within a preset range of the resonant wavelength of the circular waveguide group, wherein resonant wavelengths of circular waveguides in each circular waveguide group are equal.

7. The optical transmission method according to claim 5, wherein each first waveguide comprising first and second ports coupled with one side of a corresponding circular waveguide group, and N directly modulated lasers, N circular waveguide groups, and N first waveguides form N optical transmission components.

8. The optical transmission method according to claim 7, wherein each optical transmission component consists of a directly modulated laser, a first waveguide and a circular waveguide group comprises at least one circular waveguide, and N is greater than or equal to 2.

9. The optical transmission method according to claim 5, wherein one side of each circular waveguide group is coupled with a first waveguide corresponding to the circular waveguide group, and the other side is coupled with the second waveguide.

* * * * *